(12) United States Patent
Woodard et al.

(10) Patent No.: US 7,042,443 B2
(45) Date of Patent: May 9, 2006

(54) SPEED WRITER PROGRAM AND DEVICE WITH SPEED WRITER PROGRAM INSTALLED

(76) Inventors: Scott E. Woodard, 2800 N. Lakeshore Dr., Apt. 2205, Chicago, IL (US) 60657; Herbert A. Greenman, 293 Tennessee La., Palo Alto, CA (US) 94306

( * ) Notice: Subject to any disclaimer, the term of this patent is extended or adjusted under 35 U.S.C. 154(b) by 186 days.

(21) Appl. No.: 10/269,344

(22) Filed: Oct. 11, 2002

(65) Prior Publication Data

US 2004/0070571 A1  Apr. 15, 2004

Related U.S. Application Data

(60) Provisional application No. 60/328,641, filed on Oct. 11, 2001.

(51) Int. Cl.
*G09G 5/00* (2006.01)

(52) U.S. Cl. ................. 345/173; 345/684; 345/685; 704/2; 704/3; 704/4

(58) Field of Classification Search .............. 345/173; 704/2–4, 10
See application file for complete search history.

(56) References Cited

U.S. PATENT DOCUMENTS

| | | | |
|---|---|---|---|
| 4,339,806 A | 7/1982 | Yoshida | |
| 4,438,505 A | 3/1984 | Yanagiuchi | |
| 4,559,598 A | 12/1985 | Goldwasser | |
| 4,724,285 A | 2/1988 | Lefler | |
| 4,744,050 A | 5/1988 | Hirosawa | |
| 4,893,238 A | 1/1990 | Venema | |
| 5,574,482 A | 11/1996 | Niemeier | |
| 5,594,642 A | 1/1997 | Collins | |
| 5,623,406 A | 4/1997 | Ichbiah | |
| 5,724,457 A | 3/1998 | Fukushima | |
| 5,896,321 A | 4/1999 | Miller | |
| 6,002,390 A | 12/1999 | Masui | |
| 6,211,860 B1 | 4/2001 | Bunsen | |
| 6,690,365 B1 * | 2/2004 | Hinckley et al. | 345/173 |

* cited by examiner

*Primary Examiner*—Richard Hjerpe
*Assistant Examiner*—Ke Xiao
(74) *Attorney, Agent, or Firm*—Jeffrey P. Calfa (57) ABSTRACT

A SpeedWriter program of this invention that upon loaded into a PDA, cell phone, tablet PC, or other computer processor, the loads lists of words, phrases and special characters on disk or memory in the computer that we will refer to as a dictionary. To get to the word, the user must search through the dictionary. SpeedWriter uses the editing functions of the system by treating SpeedWriter input as combinations of keyboard strokes and of a pointing device. SpeedWriter can accommodate a word, phrase, and whole sections of text rather than just characters. SpeedWriter can use dictionaries of common phrases and include algorithms to constantly update a user's frequently used groups of words. that involves quickly scanning an internal dictionary and providing text or word options based upon selected alphanumeric sets, and further narrowing the sets of characters until the desired text is selected and also a family of devices with this method programmed there within.

10 Claims, 8 Drawing Sheets

SELECTING THE WORD SILENT.

```
a
b
c
d
e
f
g
h
i
j   sa sia sila silen silenc silent      silent
k   sc sib sild siles sileni silenti     silently
l   se sic sile silex silent silent1     silentness
m   sh sid silh        silenu silentn
n   si sie sili
o   sl sif silk
p   sm sig sill
q   so sil silo
r   sp sim silt
s   sq sin silu
t   sr sio silv
u   st sip
v   su sir
w   sw sis
x   sy sit
y      six
z      siz
```

FIG. 1

SELECTING THE WORD SILENT.

LOCATION APPROACH

FIG. 4

SIMPLE SCROLL APPROACH
FIG. 5

WHEN THE MOUSE IN IS A CERTAIN AREA OF THE SCREEN SUCH AS WHERE AN INVISIBLE SCROLL BAR WOULD BE, LOCATE Y POSITION IN THE WINDOW AND CALCULATE HOW FAR DOWN IT IS IN THE DISPLAY AREA. TAKE THIS PROPORTION AND USE IT TO CALCULATE WHAT WORD OF THE DICTIONARY IS AT THE SOME PROPORTION OF THE DICTIONARY. START LISTING ALL THE WORDS THAT FIT IN THE WINDOW.

WHEN THE USER MOVES OUT OF THE SCROLL AREA, THE LIST NO LONGER CHANGES AND THE USER SELECTS THE WORD FROM THE LIST

VELOCITY WITH A SINGLE COLUMN APPROACH
FIG. 6

MULTIPLE COLUMN VELOCITY APPROACH
FIG. 7

VELOCITY APPROACH WITH RATCHETING
FIG. 8

FIG. 9

SPEED WRITER PROGRAM AND DEVICE WITH SPEED WRITER PROGRAM INSTALLED

This is a patent issuing from a non-provisional patent application claiming the priority of provisional patent application Ser. No. 60/328,641, filed Oct. 11, 2001.

BACKGROUND

This invention relates to a program for use on a portable computer, personal digital assistant (PDA), cellular phone, or other device where keyboards have become less appealing. Keyboards are problematic due to these devices being large bulky components that must be externally connected. The SpeedWriter program is a solution to the problem. SpeedWriter provides a method for entering words (and phrases, numbers, punctuation, etc.) into a computer or related device by the user selecting from iteratively more precise subsets of the information until the desired word is located. Processor speed is not a concern in modern systems because a dictionary lookup is very fast compared to the human I/O process, even with the slowest of processors. Because memory limitations are no longer a major factor in these devices, a word list is easily stored in the device, especially with compression techniques.

PRIOR ART

Currently the most popular methods for entering text into PDA's are: synching with a file written in a different device; using hand writing recognition; using special PDA friendly characters that map directly to an alphanumeric character; displaying a keyboard on the screen; connecting an external keyboard; or voice recognition.

What is needed is a method for entering text into a portable computer, PDA, cell phone, or other device where an external keyboard is cumbersome, that involves quickly scanning an internal dictionary and providing text or word options based upon selected alphanumeric sets, and further narrowing the sets of characters until the desired text is selected and also a family of devices with this method programmed there within.

SUMMARY

An object of the invention is to provide a method for entering text into a portable computer, PDA, cell phone, or other device where an external keyboard is cumbersome, that involves quickly scanning an internal dictionary and providing text or word options based upon selected alphanumeric sets, and further narrowing the sets of characters until the desired text is selected and also a family of devices with this method programmed there within.

The SpeedWriter program of this invention satisfies the above stated objective as well as others. Once loaded into a PDA, cell phone, or other computer processor, the Speed-Writer loads lists of words, phrases and special characters on disk or memory in the computer that we will refer to as a dictionary. The dictionary can be loaded in text format, but to save time and memory the dictionary will most likely be compressed and put in a format for easy searching. To get to the word, the user must search through the dictionary. SpeedWriter has one or more dictionaries in the computer and can use many methods to help the user search for words, characters, punctuation, or editing characters and combination of editing characters (such as back space, back arrow, and CTRL back arrow). Typically a supplemental software input driver would be used so that SpeedWriter's output would appear as it came from the keyboard, but some programs may access SpeedWriter directly. SpeedWriter uses the editing functions of the program running by treating SpeedWriter input as combinations of keyboard strokes and of a pointing device. SpeedWriter can accommodate a word, phrase, and whole sections of text rather than just characters. This can lead to advantages such as fewer strokes or repetitive actions to get to a word, thus increasing efficiency. SpeedWriter can use dictionaries of common phrases and include algorithms to constantly update a user's frequently used groups of words. To improve ergonomics some methods of using Speed Writer allow smooth movements of the pointing device to input whole words or phrases with a single click, rather than a click motion for each letter.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
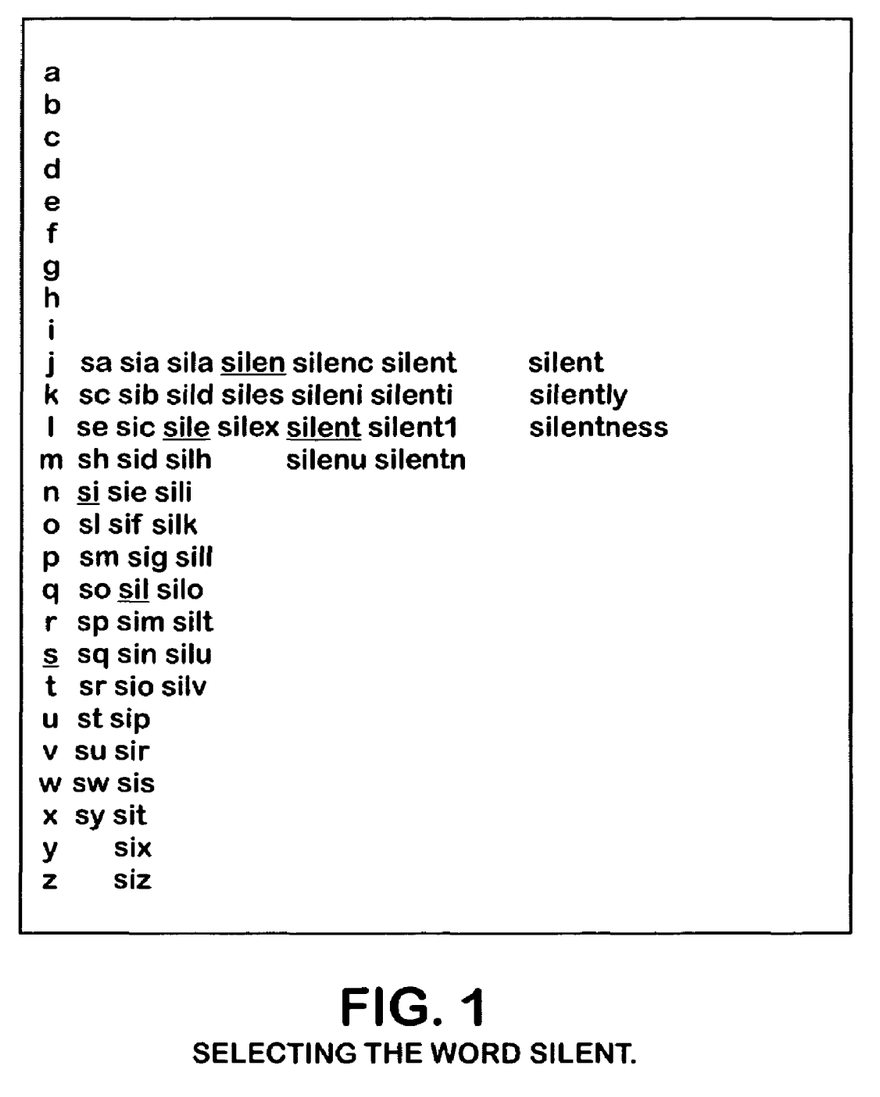
FIG. 1 is a screen appearance of a device having a program made in accordance with this invention, demonstrating the user interface of the device.
Figures 2, 3:
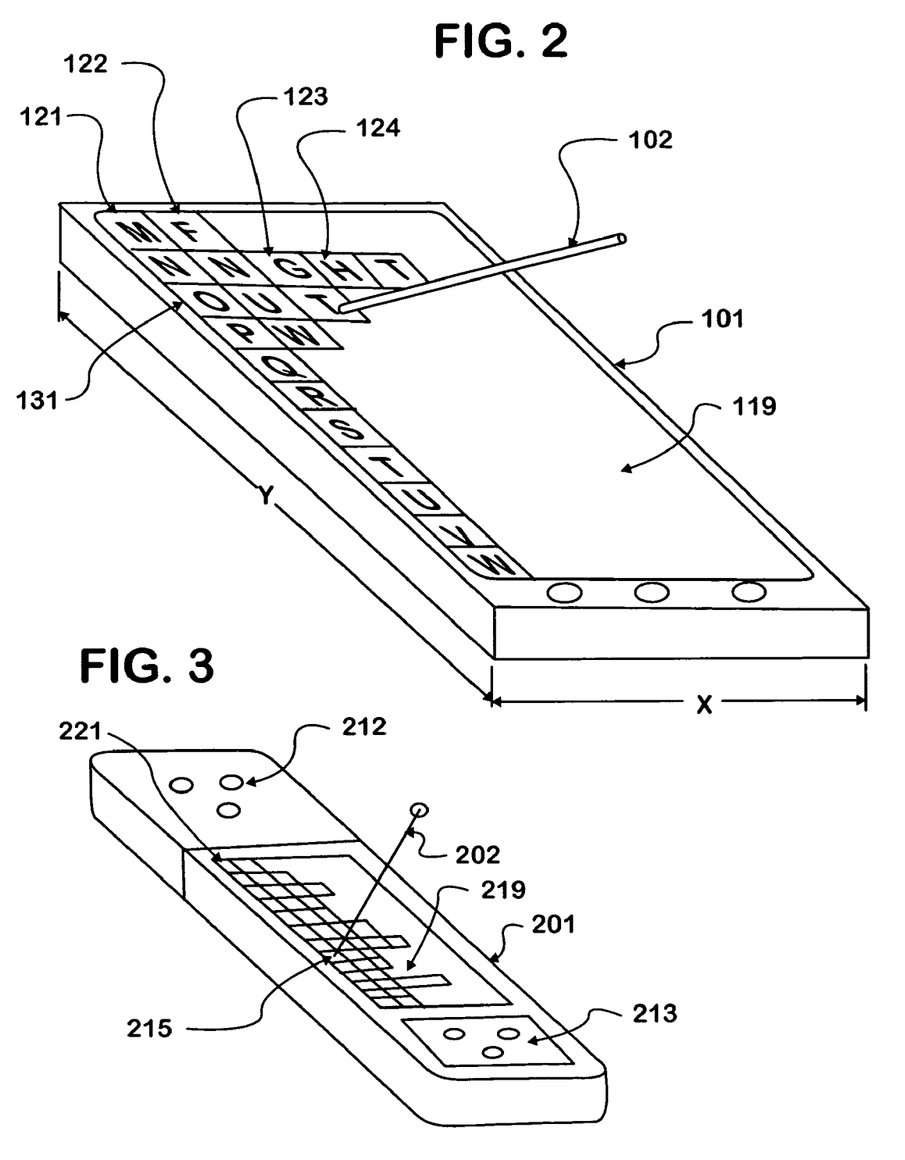
FIG. 2 is a perspective view of a PDA made in accordance with this invention.
FIG. 3 is a perspective view of a cell phone made in accordance with this invention.

The SpeedWriter program or method of this invention Is for use on a portable computer, personal digital assistant (PDA), cellular phone, or other device where use of an external keyboard is not convenient or where an internal keyboard is awkward to use. SpeedWriter provides a method for entering words (and phrases, numbers, punctuation, etc.) into a computer or related device by the user selecting from iteratively more precise subsets of the information until the desired word is located. Two such devices are shown in FIGS. 2 and 3. FIG. 2 shows a PDA 101 while FIG. 3 shows a cellular phone 201. Other electronic devices such as those mentioned above may also benefit from the use of the Speed Writer programming for rapid text entry. The PDA 101 has a touch-operated screen 119 that is sensitive to touch by either a users finger or a stylus 102 or other pointer. The operating screen 119 is lined up with X and Y coordinates. The processor of the device 101 senses position of the stylus 102 or the finger and responds to the choices of various options presented. In the example shown, the PDA 101 is programmed with the Location Approach embodiment of SpeedWriter as will be discussed below and shown in as art example in FIG. 1 and as a flow chart in FIG. 4. The user uses the stylus 102 or her finger to select the first letter of the word or phrase to be selected from the first column 121 at Y position 131. SpeedWriter senses this position and provides the second options of column 122. For the example shown, the user chose the letter 'o' as the first letter and the options were words or phrases beginning with 'o'. The user then in this example selected the 'ou' combination with the 'u' of column 122. SpeedWriter sensing this X-Y position on the screen 119, then searched its dictionary and provided column 123 options which are the words or phrases that begin in 'out'. For this example, the user chose the word 'out'. The user could have also selected in the alternative a word beginning with 'oug' and then continued selection in column 124.

It should be emphasized that the above example of SpeedWriter programming for an electronic device is just one embodiment of the program. A common element of most of the embodiments of SpeedWriter is that the processor of the electronic device 102 is programmed to provide on-screen follow-up options as to selection of particular words in response to a user touching one of the initial letter displayed on the screen 119. SpeedWriter allows for progressive narrowing of the on-screen options in response to the user's selection of follow-up options. The processor provides additional options until the user selects a desired word for text entry.

A cellular phone 201 may also use the SpeedWriter programming to enhance text entry. The cellular phone 201 of FIG. 3 has microphone 213 and speaker 212. There is a touch screen 219 that may be operated by a stylus 202 or the users finger. The user uses the stylus 202 or her finger to select the first letter of the word or phrase to be selected from the first column 221. The processor of the phone 201 senses the selection at a particular position 215 on the semen 219.

Speedwriter comes in more than one embodiment as are shown in FIGS. 4 to 9 and described below. Upon selection, SpeedWriter may then be used to choose the next word or phrase of text. SpeedWriter loads lists of words, phrases and special characters on disk or memory in the computer that we will refer to as a dictionary. The dictionary can be loaded in text format, but to save time and memory the dictionary will most likely be compressed and put in a format for easy searching. To get to the word you must search through the dictionary. SpeedWriter has one or more dictionaries in the computer and can use many methods to help the user search for words, characters, punctuation, or editing characters and combination of editing characters (such as back space, back arrow, and CTRL back arrow). Typically a supplemental software input driver would be used so that SpeedWriter's output would appear as it came from the keyboard, but some programs may access SpeedWriter directly. SpeedWriter uses the editing functions of the program running by treating SpeedWriter input as combinations of keyboard strokes and of a pointing device.

The possible platforms for using SpeedWriter are places where a keyboard may not be desirable because the user may not have both hands free, the size or shape of the equipment makes it hard to use a keyboard, the location makes a keyboard impractical, or where a keyboard is not appropriate such as in a Kiosk. Examples of types of platforms where SpeedWriter would be more practical than a keyboard may be tablet PC's, PDA's, cellular phones, wristwatch computers, calculators, normal computers in industrial environments, computers in the field. A common element of all these electronic devices are that they all have a processor (within the device 101 case) and a touch sensitive screen or display 119. The typical tool for using SpeedWriter is a pointing device 102 or 202 to select entries, which may be the user's finger, a stylus on the touch sensitive display 119, a mouse, a light pen, a pointer, a laser pointer, or any other device that can sense placement on the display 119 or shows the placement on the display 119 (such as a mouse or external tablet). Whenever a single hand is preferred for entry, SpeedWriter is suitable. All platforms may take advantage of SpeedWriter when its niche features are desirable.

SpeedWriter can accommodate a word, phrase, and whole sections of text rather than just characters. This can lead to advantages such as fewer strokes or repetitive actions to get to a word, thus increasing efficiency. SpeedWriter can use dictionaries of common phrases and include algorithms to constantly update a user's frequently used groups of words. To improve ergonomics some methods of using SpeedWriter allow smooth movements of the pointing device to input whole words or phrases with a single click, rather than a click motion for each letter. SpeedWriter also leads to better accuracy because words and phrases that are in the dictionary are completely and correctly spelled before selecting them. Even if the whole word is not there, SpeedWriter allows entry of most of the word and then the word is completed letter by letter.

The concept of this patent is selecting a word from a dictionary, and the following are just some examples of techniques that may be used with this concept.

The first requirement is to load the dictionary and extended dictionaries such as a personal dictionary where the user adds words, a special add-on dictionary such as medical or legal, and computer generated dictionaries such as frequent phrases and special words. In some instances the main dictionary is preloaded in nonvolatile memory, but if there are personal or other extensions these have to be loaded and merged with the main dictionary either at time of loading or effectively in real time using multiple passes. There are many ways to sort, merge and store the dictionaries for efficient storage and look up times.

The second requirement is to allow the user to search the dictionary for the word. There are many ways to accomplish this, mostly variations of a "location" search, a "velocity" search, or a "change in velocity search". An example of a simple "location" search is to display the list of words from memory using a mouse to move the scroll bar up or down until the word shows on the page (or just moving the mouse up and down the display without a scroll bar). An example of a simple "velocity" approach would be the same list in a memory, but using displacement from a specific point on the display or a joystick to scroll through the list. When the joystick is near its neutral position no scrolling takes place. As you move the joystick down you scroll down the list, as you move the joystick farther from the neutral position it scrolls down faster. As you get closer to the word you slow down the scrolling by moving the joystick closer to the neutral position. You scroll up the list in the opposite direction, at varying speeds by moving the joystick above the neutral position. There is an acceleration component in the joystick by how fast the user moves the joystick from one position to the next position.

Special characters, punctuation and numbers can either be entries in a dictionary or be selected by pressing on special buttons on the screen.

A way to increase efficiency for the above methods is the use of iteratively closer subsets of the word list (indexing) since the word list is too long to fit on a single screen. One method is to simulate the index tabs seen on an unabridged printed dictionary where you can see where each letter starts before opening the book. These index tabs can be simulated in software to help get to the word faster, plus with software the concept can be improved. For instance once the user gets the first letter, the software now can simulate index tabs for the first two letter combinations, and once the user gets to the first two letters the software can continue simulating index tabs for the following letters until the user can easily get to the word. The software can improve on written dictionaries by simulating pages that start with a word at an index tab and end at the word before the next index tab. Some of the examples below use this extended index tab simulation to help the user find a word Examples of an extended index tab simulation approach are as follows.

As mentioned using index tabs with software allows more flexibility than with a physical book, because finer and finer index tabs can be displayed as the user gets closer to the word. In this example you see an index tab for each the first letter combinations in the dictionary, the 26 letters of the alphabet. Once the users get to the index tab of the first letter they then see the index tabs for the two letter combinations with the first letter chosen. If there is no word for the two-letter combination in the dictionary then that two-letter combination will not show. Once the users get to the two-letter index tab the three-letter combination will show in the next column. FIG. 1 is an example of this in a multi-column approach (with almost no space between columns). In this figure when the user highlights "s" in the first column, the second column "sa" through "sz" appear in the next column. When the user highlights "si", then "sia" through "siz" appear in the next column. New columns keep appearing as the user gets to the next letter until the word is one of the indexes or is on the list in the far right. In this example the user could have selected "silent" in column 6 or could go through more columns to select the word "silently".

The following are examples of different ways for users to look up using the dictionary.

Location approach—FIG. 1 explained above is an example of using index tags with multiple columns. A way for the user to select a word with the minimal number of clicks is to use position sensing. See the flow chart of FIG. 4. Use the x coordinate for which character of the word you are using as the index tab and the y direction to select a specific index tab.

Figure 4:
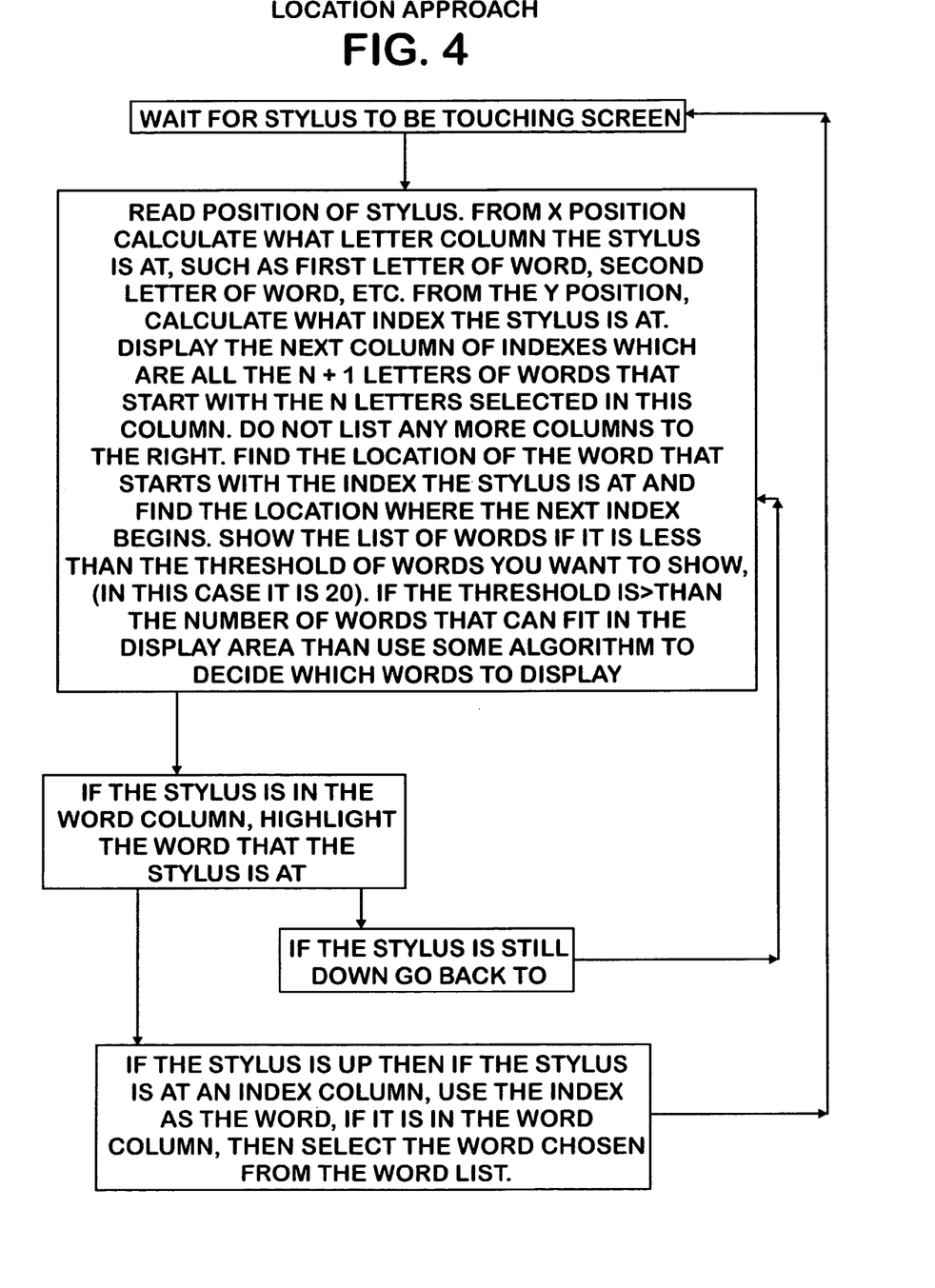
FIG. 4 is flow chart of a location approach embodiment of an algorithm that may be programmed into the devices of FIG. 1, 2, or 3.
Figure 5:
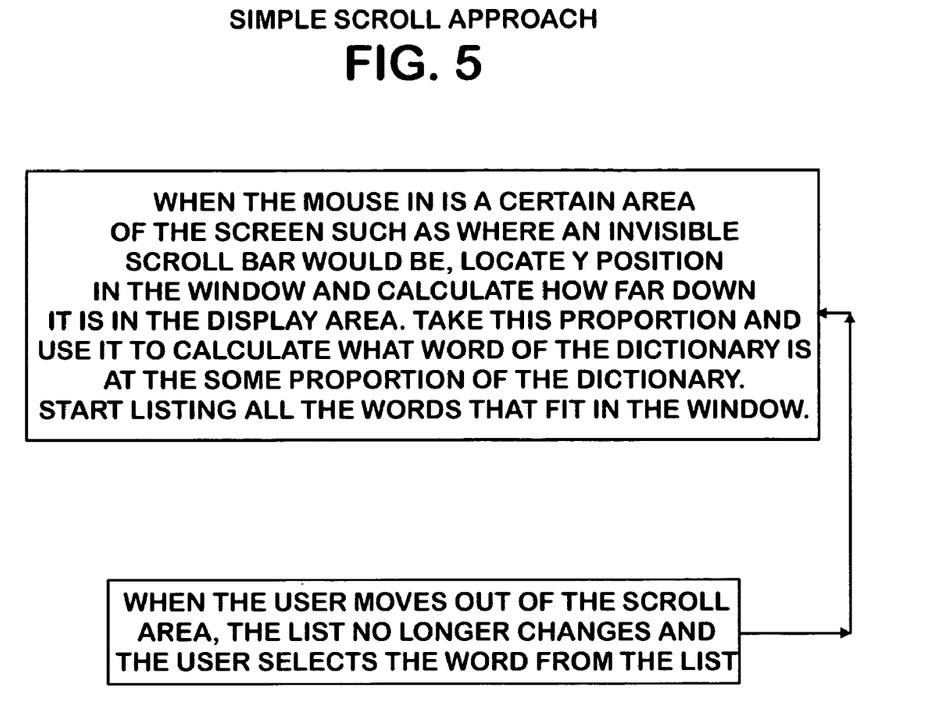
FIG. 5 is flow chart of a simple scroll approach embodiment of an algorithm that may be programmed into the devices of FIG. 1, 2, or 3.

Since the computer knows where the pointer position is, the user can put the pointer device at any letter in that column and the computer calculates what indexes belong in the next column. As you move to the next column the indexes for the column after that appear. As this is done, a list of words to choose from can appear in another part of the screen. There can be an option to allow the list to show only if it contains less than a certain amount of words, so that it is easier to hunt for the word. When the word shows up on the list the user slides the pointer to the word list and chooses the word. If the word is short and shows up as one of the indexes such as "it" the user points to that index and chooses that index as the word. There can also be special characters in column 0 such as punctuation and numerals that do not relate to indexes.

A sample algorithm for the above using a stylus is shown in FIG. 4 and described below.

Indexes in Multiple Columns.
1. Load dictionary (ies), sort, merge, and index if not done.
2. Wait for stylus to be touching screen.
3. Read position of stylus. From X position calculate what letter column the stylus is at, such as first letter of word, second letter of word, etc. From the Y position, calculate what index the stylus is at. Display the next column of indexes which are all the N+1 letters of words that start with the N letters selected in this column. Do not list any more columns to the right. Find the location of the word that starts with the index the stylus is at and find the location where the next index begins. Show the list of words if it is less than the threshold of words you want to show, (in this case it is 20). If the threshold is >than the number of words that can fit in the display area then use some algorithm to decide which words to display.

If the stylus is in the word column, highlight the word that the stylus is at.
4. If the stylus is still down go back to 3.
5. If the stylus is up then if the stylus is at an index column, use the index as the word, if it is in the word column, then select the word chosen from the word list.
6. Go to 2.

The above example shows that as the pointer is moved to the right another column appears with the next index. This may require display space needed for applications. One method to save space is to keep all the indexes in the first column, as the cursor is moved to the right of the column, the first column is over written with the next column. As the cursor is moved to the left of the column the previous index column overwrites the column of indexes.

Indexes in a single column—This version is very similar to the above but the indexes stay in the same column to conserve display space. To go to the next column the user still moves the cursor to the right, but now the next column for the next index replaces the column that the index was on. To go back one column move the cursor a certain distance to the left. To go forward one column to the next index move the cursor a certain distance to the right. To start over, move the cursor all the way to the left of the screen.

Simple scroll approach (shown in the flow chart of FIG. 5)
1. When the mouse in is a certain area of the screen such as where an invisible scroll bar would be, locate y position in the Window and calculate how far down it is in the display area. Take this proportion and use it to calculate what word of the dictionary is at the some proportion of the dictionary. Start listing all the words that fit in the window.
2. When the user moves out of the scroll area, the list no longer changes and the user selects the word from the list.
3. Go to #1.

B. Velocity approach—This approach can also be a single dimensional single column approach or a two dimensional x, y approach.

Velocity with a single column approach—In this approach the word list is in one column. The user scrolls through the word list. This uses displacement from a specified point on the display or a joystick for the input. When the joystick is at the center you can select the word at the center. As you move the joystick down you move down the list faster and faster. As you move back up, but stay below the center point it slows down until you get to the middle position where it stops again. If you move the joy stick up, it moves up the word list, related to how much the joystick is up. This works great with a button like on the IBM think pad, or a button that as you tilt it, it moves depending on the direction and how much you tilt the button. With a mouse as you move from the center dead zone, it scrolls up or down in relation to how far you are from the center. The same is true with a stylus, although you can jump easier from as high speed to low speed or even the opposite direction.

Generally with this approach the list scrolls past you. Instead of having to get the selected word in the center, the selected word can be in the list and then you choose that word. This saves some backward and forward movement to center the word wanted into a specific space.

Figure 6:
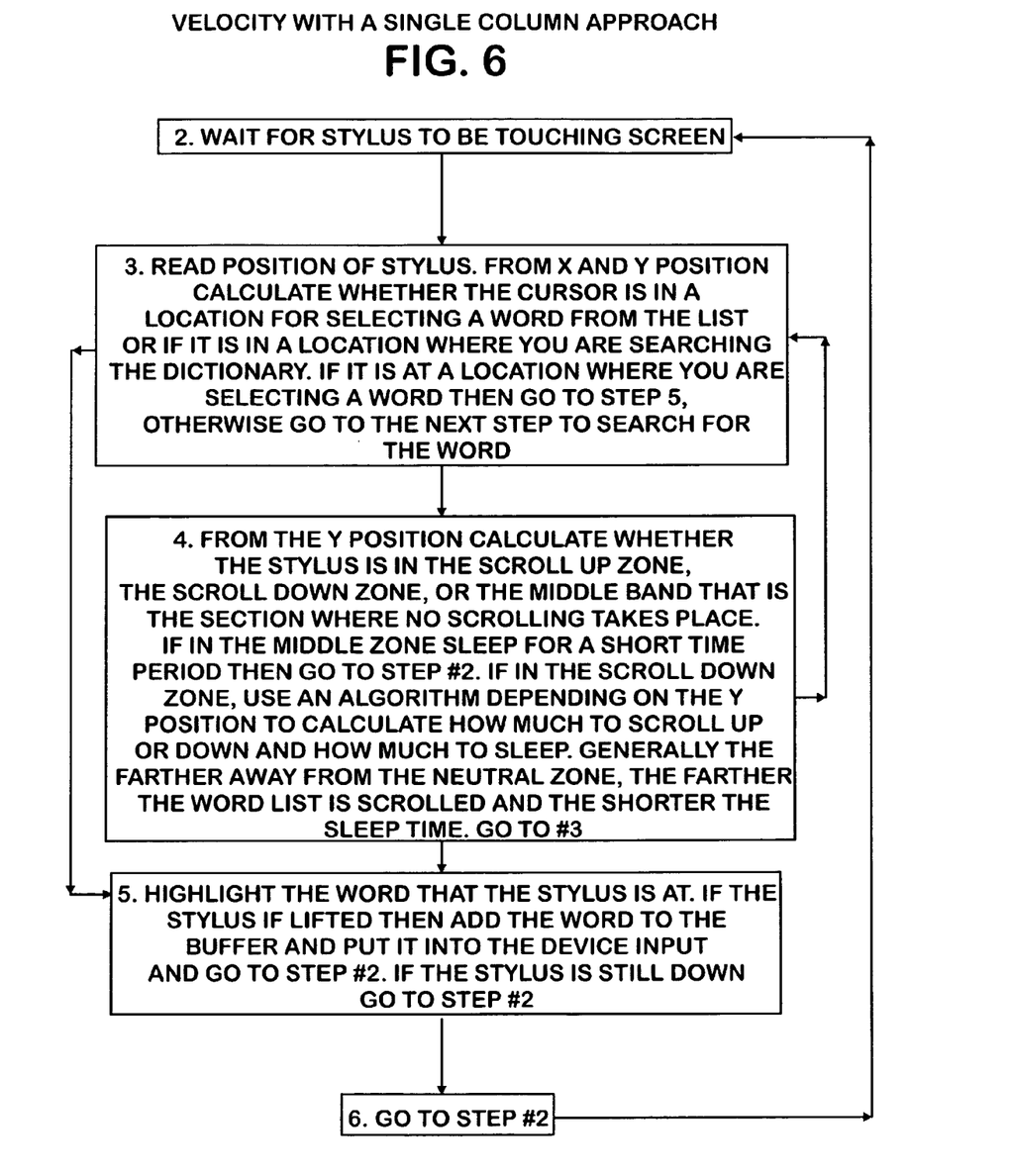
FIG. 6 is flow chart of a velocity approach embodiment of an algorithm that may be programmed into the devices of FIG. 1, 2, or 3.

A sample algorithm for the velocity approach using a stylus (shown in FIG. 6). There are four regions that the stylus can be in. One is a scroll up region that is toward the left of the screen and above the middle band. There is a middle band which is about one half inch tall in this example, it can be anywhere from a pixel to several inches. Then there is scroll down band that is below the middle band. Horizontally to the right of the scroll up, middle and scroll down region, covering the whole Y region of the screen where the word list resides.

1. Load dictionary (ies), sort, merge, and optionally index.
2. Wait for stylus to be touching screen.
3. Read position of stylus. From X and Y position calculate whether the cursor is in a location for selecting a word from the list or if it is in a location where you are searching the dictionary. If it is at a location where you are selecting a word then go to step 5, otherwise go to the next step to search for the word.
4. From the Y position calculate whether the stylus is in the scroll up zone, the scroll down zone, or the middle band that is the section where no scrolling takes place. If in the middle zone sleep for a short time period then go to step #2. If in the scroll up or scroll down zone, use an algorithm depending on the Y position to calculate how much to scroll up or down and how much to sleep. Generally the farther away from the neutral zone, the farther the word list is scrolled and the shorter the sleep time. Go to #3.
5. Highlight the word that the stylus is at. If the stylus if lifted then add the word to the buffer and put it into the device input and go to step # 2. If the stylus is still down go to step #3.
6. Go to step #2

Multiple column velocity approach—This approach is similar to the single column velocity approach except that there is more control with movement to the right or left of the screen. The movement in the x direction gives the user more control over the velocity.

A sample algorithm for the multiple column velocity approach using a stylus. There are four regions that the stylus can be in. One is a scroll up region that is toward the left of the screen and above the middle band. There is a middle band which is about one half inch tall in this example, it can be anywhere from a pixel to several inches. Then there is scroll down band which is below the middle band. Horizontally to the right of the scroll up, middle and scroll down region, covering the whole Y region of the screen is the word list region. See also FIG. 7.

Figure 7:
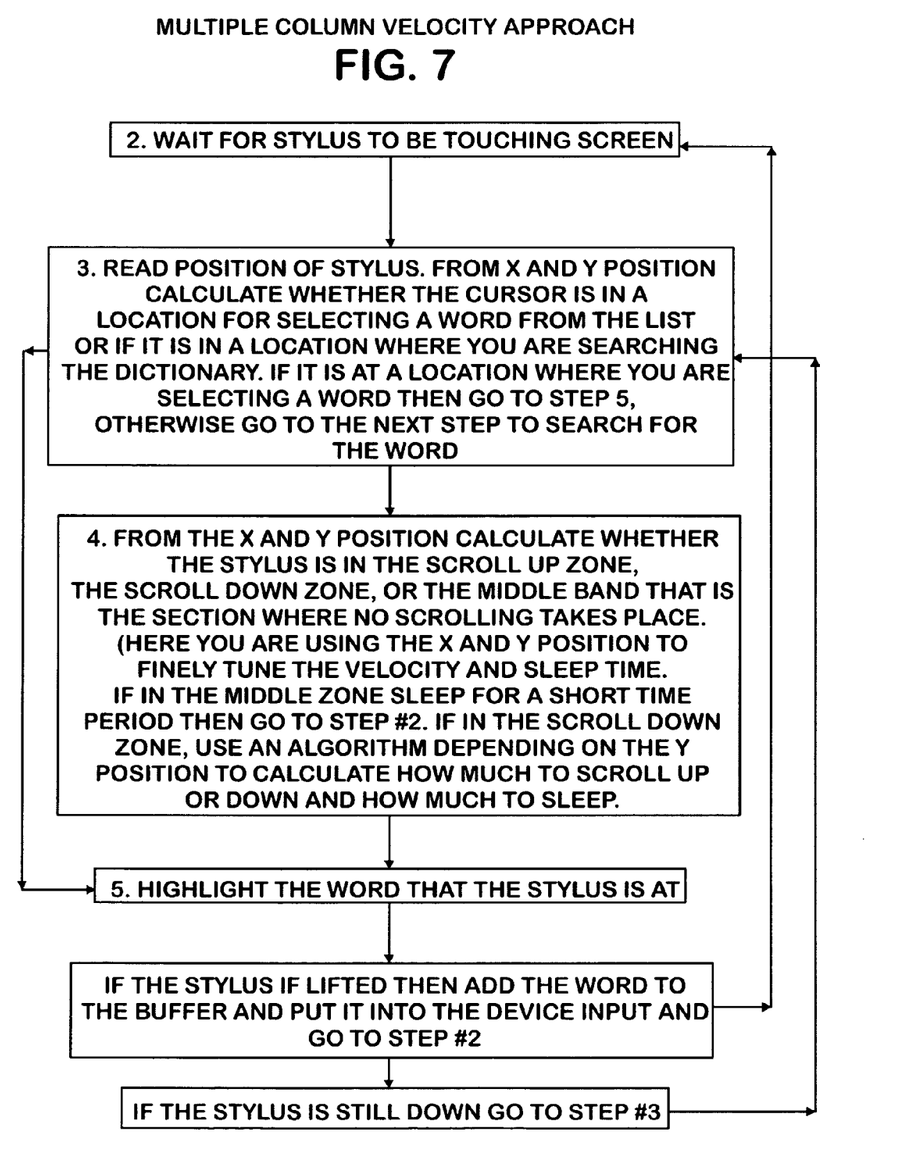
FIG. 7 is flow chart of a multiple column velocity approach embodiment of an algorithm that may be programmed into the devices of FIG. 1, 2, or 3.

1. Load dictionary (ies), sort, merge, and optionally index.
2. Wait for stylus to be touching screen.
3. Read position of stylus. From X and Y position calculate whether the cursor is in a location for selecting a word from the list or if it is in a location where you are searching the dictionary. If it is at a location where you are selecting a word then go to step 5, otherwise go to the next step to search for the word.
4. From the X and Y position calculate whether the stylus is in the scroll up zone, the scroll down zone, or the middle band that is the section where no scrolling takes place. (Here you are using the X and Y position to finely tune the velocity and sleep time. If in the middle zone sleep for a short time period then go to step #2. If in the scroll up or scroll down zone, use an algorithm depending on the Y position to calculate how much to scroll up or down and how much to sleep.
5. Highlight the word that the stylus is at.

If the stylus if lifted then add the word to the buffer and put it into the device input and go to step #2.

If the stylus is still down go to step #3.
6. Go to step #2

D. Velocity approach with ratcheting. (Uses indexes)—This approach is similar to the velocity approach but instead of scrolling smoothly there are short breaks at the indexes or where there are letter changes. This makes it easier not to pass a word. If you use the X axis, you move to the right as you get closer to the word and the hesitations happen at index tabs farther into the word.

Figure 8:
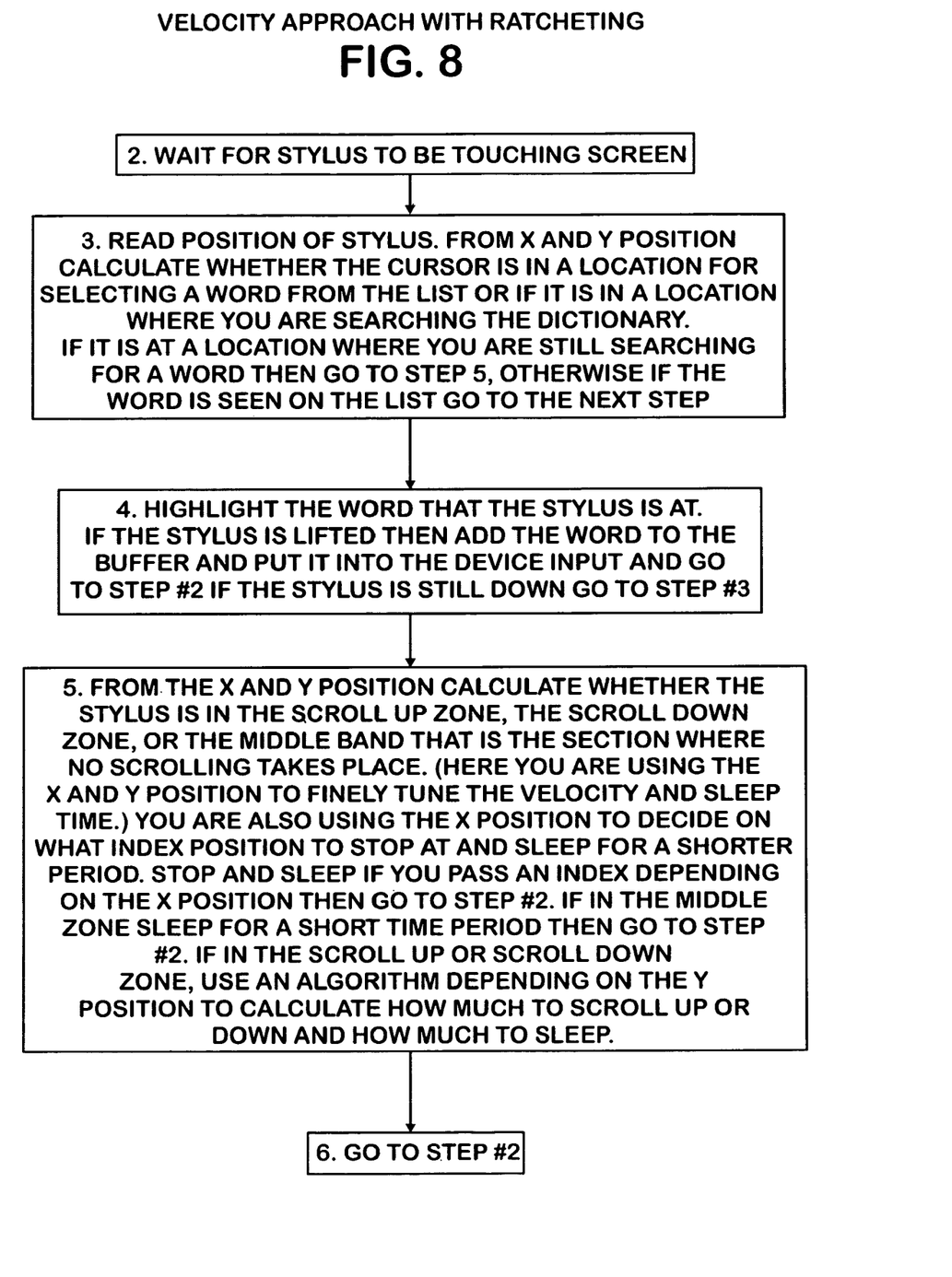
FIG. 8 is flow chart of a velocity approach with ratcheting embodiment of an algorithm that may be programmed into the devices of FIG. 1, 2, or 3.

There are four regions that the stylus can be. One is a scroll up region that is toward the left of the screen and above the middle band. There is a middle band which is about one half inch tall in this example, it can be anywhere from a pixel to several inches. Then there is scroll down band that is below the middle band. Horizontally to the right of the scroll up, middle and scroll down region, covering the whole Y region of the screen is the word list region. (FIG. 8)

1. Load dictionary (ies), sort, merge, and optionally index.
2. Wait for stylus to be touching screen.
3. Read position of stylus. From X and Y position calculate whether the cursor is in a location for selecting a word from the list or if it is in a location where you are searching the dictionary. If it is at a location where you are still searching for a word then go to step 5, otherwise if the word is seen on the list go to the next step.
4. Highlight the word that the stylus is at.

If the stylus if lifted then add the word to the buffer and put it into the device input and go to step #2.

If the stylus is still down go to step #3.
5. From the X and Y position calculate whether the stylus is in the scroll up zone, the scroll down zone, or the middle band that is the section where no scrolling takes place. (Here you are using the X and Y position to finely tune the velocity and sleep time.) You are also using the X position to decide on what index position to stop at and sleep for a shorter period. Stop and sleep if you pass an index depending on the X position then go to step #2. If in the middle zone sleep for a short time period then go to step #2. If in the scroll up or scroll down zone, use an algorithm depending on the Y position to calculate how much to scroll up or down and how much to sleep.
6. Go to step #2

E. Bounds approach—In this approach there are two columns. Column one has the indexes starting at the upper bound of the chosen range to the lower bound of the chosen range. For example if the dictionary range is reduced from "b" to "c", the indexes could be "ba", "be", "bi", "bo", "bu", and "by". Column two would be the representative common words for that user that are in that range and fit in the dictionary display area.

The user will start by seeing the indexes for the whole dictionary in column one, typically the letters "a"–"y" and "zz". Column two will have common words for that user that fit in the display area. The user then taps on an index and that becomes the new upper bound of the dictionary, then taps on the next index to be the new lower bound and each tap alternately defines the next upper and lower bounds. This continues until the dictionary is narrowed enough to display the word wanted in the second column. At any point the user sees the word in the second column, the user taps on the chosen word or phrase to become part of the sentence. Note that if the user narrows the dictionary too much the program will automatically go back a couple of steps to expand the choices again.

For example to choose the word "silently" the user would tap on "5", now the dictionary ranges from "s" to "zz". The user then taps on "so" and the dictionary now ranges from "si" to "so". The user then taps on "sil", then "silh" and by then the word "silently" can be chosen from column two.

Figure 9:
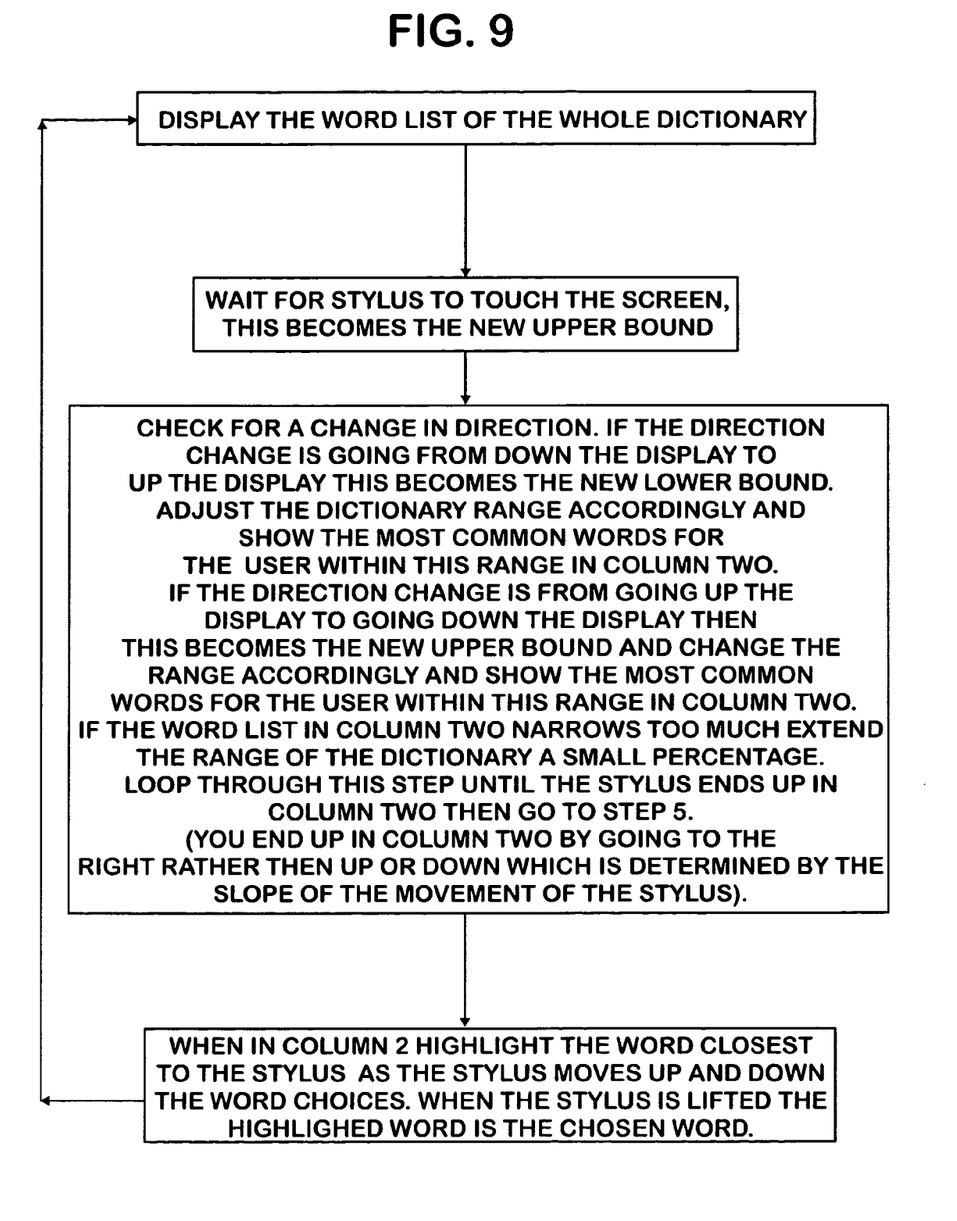
FIG. 9 is flow chart of a bounds approach embodiment of an algorithm that may be programmed into the devices of FIG. 1, 2, or 3.

The continuous bounds approach described in FIG. 9 is the same as above but the stylus is put down on column one to choose the upper bound and is not lifted until the word is chosen. In this method, when the user changes the movement of the stylus from going down the display to going up the display, this becomes the new lower bound, and when the user changes the movement of the stylus from going up the display to going down the display this becomes the new upper bound. The user continues narrowing the dictionary until the wanted word is seen in column two, then the user moves the stylus from column one to column two by going to the right rather than up or down. Once in column two the user moves through the word list to choose the wanted word and lifts up the stylus so the program knows that this is the chosen word.

In this method when the user is in column two, as the stylus is moved the word closest to the stylus is generally highlighted or underlined depending on the display density. This gives the user better feedback of when the stylus is approaching or on the chosen word.

In the example to choose the word "silently", the user puts the stylus down on "s", slides it down to "si", slides it up to "sil", then slides it down to "silh", starts sliding it up and sees the word in column two, moves the stylus across to column two, slides the stylus to the word "silently" and picks up the stylus.

A sample algorithm for the bounds approach using a stylus is shown in FIG. 9 as follows.
1. Load dictionary (ies), sort, merge, and index if not done.
2. Display the word list of the whole dictionary
3. Wait for stylus to touch the screen; this becomes the new upper bound.
4. Check for a change in direction. If the direction change is going from down the display to up the display this becomes the new lower bound. And adjust the dictionary range accordingly and show the most common words for the user within this range in column two. If the direction change is from going up the display to going down the display then this becomes the new upper bound and change the range accordingly and show the most common words for the user within this range in column two. If the word list in column two narrows too much, the range of the dictionary is extended a small percentage. Loop through this step until the stylus ends up in column two then go to step 5. (You end up in column two by going to the right rather than up or down which is determined by the slope of the movement of the stylus).
5. When in column 2 highlight the word closest to the stylus as the stylus moves up and down the word choices. When the stylus is lifted the highlighted word is the chosen word.
6. Go to step 2.

As described above, the SpeedWriter program and a device with the SpeedWriter program installed provide a number of advantages, some of which have been described above and others of which are inherent in the invention. Also modifications may be proposed to the SpeedWriter program and a device with the SpeedWriter program installed without departing from the teachings herein.

We claim:

1. A device for a user to enter word text data, comprising:
a data processor;
a touch sensitive screen in communication with said processor;
a memory module in communication with said processor;
a dictionary of words loaded within said memory module;
said processor programmed to allow selection of words from said dictionary for text entry in response to a user touching said screen at a contact location and varying contact location to access, display, and select specific words for text data;
said screen being defined by X lateral and Y vertical coordinates; and
said processor programming comprising the steps of:
reading position of user screen contact location upon a user touching of said screen;
calculating what N letter column the user screen contact is at from X position;
calculating what index the user screen contact is at from Y position;
displaying a next column of indexes which are all N+1 letters of words that start with the N letters selected in this column and not listing any more columns to the right;
finding the location of the word that starts with the index the user screen contact is at and finding a location where a next index begins;
showing a list of words if it is less than a threshold of words;
annotating or highlighting words if the user screen contact is in a word column; and
reiterating the steps of using X and V coordinates to provide additional columns to narrow dawn user options if the user maintains screen contact or if user screen contact has ceased, using the index as the selected word if it is in the word column.

2. A device for a user to enter word text data, comprising:
a data processor;
a touch sensitive screen in communication with said processor;
a memory module in communication with said processor,
a dictionary of words loaded within said memory module;
said processor programmed to allow selection of words from said dictionary for text entry in response to a user touching said screen at a contact location and varying contact location to access, display, and select specific words for text data;
said screen being defined by X lateral and Y vertical coordinates; and said processor programming comprising the steps of:
  reading position of user screen contact location upon a user touching of said screen;
  calculating whether said user screen contact is in a location for selecting a word from a list or in a position for searching said dictionary from X and Y coordinates; and
  if said user screen contact is in a position for searching said dictionary, calculating whether said user screen contact is in a scroll up zone, a scroll down zone, or a no scroll zone, and if in a no scroll zone, pausing a short time before returning to said step for reading position upon user touching said screen, and in said scroll up or scroll down zone, calculating how much to scroll up or down depending on said Y coordinate and how much to sleep, farther from a neutral zone, the farther a word list is scrolled and the shorter the sleep time, and then reiterating said above step of calculating whether said user screen contact is in a location for selecting a word from a list or in a position for searching said dictionary from X and Y coordinates;
  if said user screen contact is in a location for selecting a word from a list highlighting the word that said user screen contact is at and if the user ceases contact with then adding the specified word to the buffer and putting the word into a device input.

3. A device for a user to enter word text data comprising:
a data processor;
a touch sensitive screen in communication with said processor;
a memory module in communication with said processor a dictionary of words loaded within said memory module;
said processor programmed to allow selection of words from said dictionary for text entry in response to a user touching said screen at a contact location and varying contact location to access, display, and select specific words for text data;
said screen being defined by X lateral and Y vertical coordinates; and
said processor programming comprising the steps of:
  reading position of user screen contact location upon a user touching of said screen;
  calculating whether said user screen contact is in a location for selecting a word from a list or if said user screen contact is in a location for searching said dictionary from X and Y position; and
  if user screen contact is in a location for searching said dictionary, calculating whether a stylus is in a scroll up zone, a scroll down zone, or a middle band that is the section where no scrolling takes place from the X and Y position, if in said middle band sleep for a short time period then reiterating said step of reading user screen position upon user contact, and if said user screen position in said scroll up or scroll down zone, calculating how much to scroll up or down and how much to sleep dependent on Y position;
  if user screen contact is at a location selecting a word, then highlighting the word that said user screen position is at; and
  if user contact with said screen ceases, then adding the word to a buffer and put the word into device input.

4. A device for a user to enter word text data, comprising:
a data processor;
a touch sensitive screen in communication with said processor;
a memory module in communication with said processor a dictionary of words loaded within said memory module;
said processor programmed to allow selection of words from said dictionary for text entry in response to a user touching said screen at a contact location and varying contact location to access, display, and select specific words for text data;
said screen being defined by X lateral and Y vertical coordinates; and
said processor programming comprising the steps of:
  reading position of user screen contact location upon a user touching of said screen;
  calculating whether said user screen contact is in a location for selecting a word from a list or if said user screen contact is in a location for searching said dictionary from X and Y position, and if said user screen contact is in a location for searching said dictionary, then highlighting the word that said user screen contact is at, and if said user screen contact is ceased then adding the word to a buffer and putting the word into device input, and if user screen contact continues, repeating said step of calculating whether said user screen contact is in a location for selecting a word from a list or if said user screen contact is in a location for searching said dictionary from X and Y position;
  if said user screen contact is at a location for searching for a word then from X and Y position calculating whether said user screen contact is in a scroll up zone, a scroll down zone, or a middle band where no scrolling takes place, if said user screen contact is in said middle band, directing sleep for a short time period then repeating said step for reading position of user screen contact location upon a user touching of said screen, and if said user screen contact is in said scroll up or scroll down zones, calculating how much to scroll up or down and how much to sleep.

5. A device for a user to enter word text data, comprising:
a data processor;
a touch sensitive screen in communication with said processor;
a memory module in communication with said processor;
a dictionary of words loaded within said memory module;
said processor programmed to allow selection of words from said dictionary for text entry in response to a user touching said screen at a contact location and varying contact location to access, display, and select specific words for text data;
said screen being defined by X lateral and Y vertical coordinates; and
said processor programming comprising the steps of:
  displaying an index of the word list in a column one and a word list in a column two of the most common words that fit in the display of said whole dictionary;
  reading position of user screen contact location upon a user touching of said screen in the column one and making that the new upper bound of the index and word list;
  checking for a change in direction, if from down to up change this to the new lower bound of the dictionary, index, and adjusting the word list displaying the most common words for that user in the column two that fit in the display accordingly, and if from up to down changing this to the new upper bound of the dictionary, index, and adjusting the word list displaying the most common words for that user in column two that fit in the display accordingly, and keeping changing the lower and upper bounds with the up down change in direction until a stylus goes to column two by traveling to the right instead of up and down, and when the stylus is in column two highlighting the closest word to the stylus as the stylus moves up and down the word list; choosing the word that is highlighted when the stylus is lifted.

6. A program for a processor of a device for a user to enter word text data, the device having a data processor, a touch sensitive screen in communication with the processor, a memory module in communication with said processor, a dictionary of words loaded within said memory module, and the screen being defined by X lateral and Y vertical coordinates, comprising the steps of:
  allowing selection of words from the dictionary for text entry in response to a user touching said screen at a contact location;
  varying contact location to access, display, and select specific words for text data;
  reading position of user screen contact location upon a user touching of the screen;
  calculating what N letter column the user screen contact is at from X position;
  calculating what index the user screen contact is at from Y position;
  displaying a next column of indexes which are all N+1 letters of words that start with the N letters selected in this column and not listing any more columns to the right;
  finding the location of the word that starts with the index the user screen contact is at and finding a location where a next index begins;
  showing a list of words if it is less than a threshold of words;
  annotating or highlighting words if the user screen contact is in a word column; and
  reiterating the steps of using X and Y coordinates to provide additional columns to narrow down user options if the user maintains screen contact or if user screen contact has ceased, using the index as the selected word if it is in the word column.

7. A program for a processor of a device for a user to enter word text data, the device having a data processor, a touch sensitive screen in communication with the processor, a memory module in communication with said processor; a dictionary of words loaded within said memory module, and the screen being defined by X lateral and Y vertical coordinates, comprising the steps of:
  allowing selection of words from the dictionary for text entry in response to a user touching said screen at a contact location;
  varying contact location to access, display, and select specific words for text data;
  reading position of user screen contact location upon a user touching of the screen;
  calculating whether the user screen contact is in a location for selecting a word from a list or in a position for searching the dictionary from X and Y coordinates; and
  if the user screen contact is in a position for searching the dictionary, calculating whether the user screen contact is in a scroll up zone, a scroll down zone, or a no scroll zone, and if in a no scroll zone, pausing a short time before returning to said step for reading position upon user touching the screen, and in said scroll up or scroll down zone, calculating how much to scroll up or down depending on the Y coordinate and how much to sleep, farther from a neutral zone, the farther a word list is scrolled and the shorter the sleep time, and then reiterating said above step of calculating whether the user screen contact is in a location for selecting a word from a list or in a position for searching the dictionary from X and Y coordinates;
  if the user screen contact is in a location for selecting a word from a list highlighting the word that the user screen contact is at and if the user ceases contact with then adding the specified word to the buffer and putting the word into a device input.

8. A program for a processor of a device for a user to enter word text data, the device having a data processor, a touch sensitive screen in communication with the processor, a memory module in and the screen being defined by X lateral and Y vertical coordinates, comprising the steps of:
  allowing selection of words from the dictionary for text entry in response to a user touching said screen at a contact location;
  varying contact location to access, display, and select specific words for text data;
  reading position of user screen contact location upon a user touching of said screen;
  calculating whether said user screen contact is in a location for selecting a word from a list or if said user screen contact is in a location for searching said dictionary from X and Y position; and
  if user screen contact is in a location for searching said dictionary, calculating whether a stylus is in a scroll up zone, a scroll down zone, or a middle band that is the section where no scrolling takes place from the X and Y position, if in said middle band sleep for a short time period then reiterating said step of reading user screen position upon user contact, and if said user screen position in said scroll up or scroll down zone, calculating how much to scroll up or down and how much to sleep dependent on Y position;
  if user screen contact is at a location selecting a word, then highlighting the word that said user screen position is at; and
  if user contact with said screen ceases, then adding the word to a buffer and put the word into device input.

9. A program for a processor of a device for a user to enter word text data, the device having a data processor, a touch sensitive screen in communication with the processor, a memory module in communication with said processor; a dictionary of words loaded within said memory module, and the screen being defined by X lateral and Y vertical coordinates comprising the steps of:
  allowing selection of words from the dictionary for text entry in response to a user touching said screen at a contact location;
  varying contact location to access, display, and select specific words for text data;
  reading position of user screen contact location upon a user touching of the screen;
  calculating whether the user screen contact is in a location for selecting a word from a list or if the user screen contact is in a location for searching the dictionary from X and Y position, and if the user screen contact is in a location for searching the dictionary, then highlighting the word that the user screen contact is at, and if the user screen contact is ceased then adding the word to a buffer and putting the word into device input, and if user screen contact continues, repeating said step of calculating whether the user screen contact is in a location for selecting a word from a list or if the user screen contact is in a location for searching the dictionary from X and Y position;

if the user screen contact is at a location for searching for a word then from X and Y position calculating whether the user screen contact is in a scroll up zone, a scroll down zone, or a middle band where no scrolling takes place, if the user screen contact is in the middle band, directing sleep for a short time period then repeating said step for reading position of user screen contact location upon a user touching of the screen, and if the user screen contact is in the scroll up or scroll down zones, calculating how much to scroll up or down and how much to sleep.

10. A program for a processor of a device for a user to enter word text data, the device having a data processor, a touch sensitive screen in communication with the processor, a memory module in communication with said processor; a dictionary of words loaded within said memory module, and the screen being defined by X lateral and Y vertical coordinates, comprising the steps of:

allowing selection of words from the dictionary for text entry in response to a user touching said screen at a contact location;

varying contact location to access, display, and select specific words for text data;

said screen being defined by X lateral and Y vertical coordinates; and said processor programming comprising the steps of:

displaying an index of the word list in a column one and a word list in a column two of the most common words that fit in the display of said whole dictionary;

reading position of user screen contact location upon a user touching of said screen in column one and making that the new upper bound of the index and word list;

checking for a change in direction, if from down to up changing this to the new lower bound of the dictionary, index, and adjust the word list displaying the most common words for that user in column two that fit in the display accordingly and if from up to down changing this to the new upper bound of the dictionary, index, and adjusting the word list displaying the most common words for that user in column two that fit in the display accordingly, and keeping changing the lower and upper bounds with the up down change in direction until a stylus goes to column two by traveling to the right instead of up and down, and when the stylus is in column two highlighting the closest word to the stylus as the stylus moves up and down the word list; choosing the word that is highlighted when the stylus is lifted.

* * * * *